(12) United States Patent
Davis et al.

(10) Patent No.: US 7,219,081 B1
(45) Date of Patent: May 15, 2007

(54) METHODS OF OBTAINING AND USING MANUFACTURER COMPUTER HARDWARE CONFIGURATION DATA

(75) Inventors: Rose K. Davis, Austin, TX (US); Elizabeth R. Hainley, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/491,286

(22) Filed: Jan. 25, 2000

(51) Int. Cl.
*G06Q 40/00* (2006.01)

(52) U.S. Cl. ....................................................... 705/37
(58) Field of Classification Search ................. 705/37, 705/26, 22, 27, 28, 29, 1, 80, 14; 709/224
See application file for complete search history.

(56) References Cited

U.S. PATENT DOCUMENTS

| | | | | |
|---|---|---|---|---|
| 5,530,753 A * | 6/1996 | Easter et al. ................. | 713/191 |
| 6,012,045 A * | 1/2000 | Barzilai et al. ............... | 705/37 |
| 6,055,516 A * | 4/2000 | Johnson et al. ............... | 705/27 |
| 6,058,373 A * | 5/2000 | Blinn et al. .................... | 705/22 |
| 6,058,417 A * | 5/2000 | Hess et al. .................... | 709/219 |
| 6,154,738 A * | 11/2000 | Call .............................. | 707/4 |
| 6,167,383 A * | 12/2000 | Henson ........................ | 705/26 |
| 6,170,056 B1 * | 1/2001 | Sidie ............................ | 713/2 |
| 6,202,051 B1 * | 3/2001 | Woolston ..................... | 705/27 |
| 6,230,199 B1 * | 5/2001 | Revashetti et al. ........... | 705/14 |
| 6,341,270 B1 * | 1/2002 | Esposito et al. .............. | 705/26 |
| 6,647,373 B1 * | 11/2003 | Carlton-Foss ................ | 705/37 |
| 2002/0029181 A1 * | 3/2002 | Miller et al. .................. | 705/37 |
| 2003/0105682 A1 * | 6/2003 | Dicker et al. ................. | 705/27 |

OTHER PUBLICATIONS

Anonymous. Are You Y2K Compliant. The API Account. Baltimore: Spring 1999. vol. 26, issue 1. p. 3.*
Rathbone, A. Upgrading & Fixing PCs For Dummies: 4th Edition. Foster City, CA, IDG Books Worldwide Inc, 1998. pp. 75-76, 163, 320 and 326.*
Kraynak, J. The Complete Idiot's Guide to PCs: 6th Edition. New York, NY, Alpha Books, 1998. pp. 297 and 304.*
Kaplan, K. Integrating Old PCs Back Into Society. Los Angeles Times. (Dec. 20, 1995). p. 4.*
Siguel, E.N. A PC Buyer's Primer. Medical Laboratory Observer, vol. 26, No. 10 (Oct. 1994). pp. 70-73.*

(Continued)

*Primary Examiner*—James Trammell
*Assistant Examiner*—Jason Borlinghaus
(74) *Attorney, Agent, or Firm*—Baker Botts L.L.P.

(57) ABSTRACT

A method for determining the configuration of a hardware item use with an online auction system is disclosed. The configuration is determined by sending a unique code to the manufacturer that manufactured the hardware and receiving configuration data corresponding to the hardware. The configuration is further determined by executing configuration utility software that analyzes the hardware using diagnostic routines as well as analyzing the operating system registry for hardware information. Re-use of components in the old computer system in a new computer system is also disclosed for maximizing total value of the purchase of a new computer system by re-using high value components. The method retrieves the street price corresponding to the old computer system and subtracts the price from the new computer price without the reused components in order to minimize the cost of the transaction. A computer system for receiving configuration data and submitting an auction description to an online auction site is further disclosed.

18 Claims, 8 Drawing Sheets

OTHER PUBLICATIONS

Sparks, P. Getting Personal: A Growing Number of Computer-Buyers Are Opting For Made-To-Order Machines. The Augusta Chronicle. (Feb. 16, 1999). p. B01.*

Compaq Alleges Parts Swindle. Information Week, No. 524 (Apr. 24, 1995). p. 32.*

Rood, Stephen C. Computer Hardware Maintenance. Reed Elsevier Group. Newtown, MA. 1996. pp. 143-144.*

Rathbone, A. Upgrading & Fixing PCs For Dummies: 4th Edition. Foster City, CA, IDG Books Worldwide Inc, 1998. pp. 26 and 88-89.*

Jacobs, April. More Businesses Buying PCs Online. Computerworld. Framingham. vol. 32, iss. 34. Aug. 24, 1998. pp. 45-46.*

Rathbone, A. Upgrading & Fixing PCs For Dummies: 4th Edition. Foster City, CA, IDG Books Worldwide Inc, 1998. pp. 12-16, 58-62, 164, 184-185 and 321-322.*

Russell, Deborah & Gangemi Sr, G.T. Computer Security Basics. O'Reilly & Associates. 1991. pp. 146-147.*

\* cited by examiner

Please enter your Dell Service Tag Number — 400

Please select the specifications which best describe your product:

| Field | Value |
|---|---|
| Manufacturer * | -Please choose one- — 410 |
| Processor * | -Please choose one- — 412 |
| Operating System * | -Please choose one- — 414 |
| Memory (MB): | — 416 |
| Hard Drive (GB) | — 418 |
| CD-ROM? | — 420 |
| Case | -Choose option- — 422 |
| Modem | — 424 |
| Mfg. Part No. | — 426 |
| Condition | -Choose option- — 428 |
| Monitor | -Choose option- — 430 |
| Graphics Card | -Choose option- — 432 |
| Network Card | -Choose option- — 434 |
| Speakers | -Choose option- — 436 |
| MHZ | — 438 |
| Platform | -Choose option- — 440 |
| Level-2 Cache | — 442 |
| # of CPU Sockets | — 444 |
| # of CPU Installed. | — 446 |
| Memory (maximum): | — 448 |
| Audio | — 450 |
| Tape | — 452 |
| I/O Expansion Slots | — 454 |
| Standard Interfaces: | — 456 |
| SCSI Interface: | — 458 |
| USB Interface | — 460 |
| Chassis / Form Factor | — 462 |
| Keyboard / Mouse | -Choose option- — 464 |
| Dimensions (H x W x D): | — 466 |
| Type. | — 468 |
| Disk | — 470 |
| Communications Card | — 472 |
| Total Weight | — 474 |
| Video (MB) | — 476 |
| Warranty | — 478 |

Step 1- enter Dell Service Tag #

• Step 2- system specifications are automatically pulled from Dell database to populate these fields.

*FIG. 4*

METHODS OF OBTAINING AND USING MANUFACTURER COMPUTER HARDWARE CONFIGURATION DATA

BACKGROUND OF THE INVENTION

1. Field of the Invention

This invention relates to online auctions using large computer networks, such as the Internet, and more particularly, to specifying components in a computer system for sale in an online auction by using data stores and computer configuration tools.

2. Description of the Related Art

Online auctions provide a means for sellers and buyers to interact on a larger scale than previously allowed with traditional auctions. An incentive of sellers is to describe the items available for sale clearly and accurately in order to elicit favorable responses from potential buyers (bidders) and obtain the highest price for the item. A further incentive is to provide accurate information to avoid complaints and cancellations because the item received does not match the description provided in the online auction.

Unlike traditional auctions, it is usually difficult or impossible to test items for sale in an online auction. While photographs may be placed in the online auction, some items, such as computer hardware, cannot be fully described with a simple photograph. Indeed, while two computer systems may appear to be similar or identical, one may be worth more because of its internal, and therefore unseen, components. For example, a computer system with more memory, a faster processor, a DVD drive and the like is probably worth more than a comparable system with less memory, a slower processor, and a CD-ROM drive.

Many people who own computer systems are not technically competent and do not understand the components inside their computer system. Computer owners often own their systems for several months or years before replacing the systems. During the time of ownership, the owner may have upgraded various components that were in the computer system as originally shipped. For example, the user may have added additional memory to the system, added multimedia devices, such as DVD players, sound cards, and graphics accelerators, added additional non-volatile storage devices, such as additional or larger hard drives, ZIP drives, recordable CD drives (CD-RW), and the like. When the owner decides to sell his or her computer system through an online auction, it is challenging to accurately describe the system and components available for sale. Overstating the system in terms of technology or components may result in disgruntled purchasers who may have paid extra for components or technology that did not come with the system received. Understating the system by forgetting to list components in the computer system may result in receiving less money from the bidders participating in the auction.

An additional challenge exists when the owner of a computer system wishes to trade in his or her old computer for a new computer. These users may want to remove high cost components from their old computer and put these components in their new computer system, especially if the amount they are likely to receive at an online auction for such components is significantly less than the price of these same components in a new computer system. The challenge in determining which, if any, of the components in the old computer system to remove and place in the new computer is difficult because of the dynamic nature of the prices and the number of components involved. A further challenge is determining which, if any, of the components in the old computer system are compatible (e.g., form factor and technology) with the new computer system.

Accordingly, a need has arisen for a method of determining the components contained in an existing computer system and for comparing these components with components in a new computer system. More particularly, a need has arisen for a method and system for determining which components in a current computer system are economically and technologically viable for use in a prospective new computer system.

SUMMARY OF THE INVENTION

It has been discovered that accuracy of descriptions of hardware that is submitted by sellers to online auction sites is improved by retrieving hardware configuration information from the manufacturer using a unique code corresponding to the hardware shipped to the customer from the manufacturer.

In another aspect of the invention, configuration utility software is executed on the hardware to determine configuration information and components contained within the hardware before submitting the hardware description to the auction site for sale. The user can verify and modify the hardware description in order to remove components that will not be included with the auctioned hardware or add additional items not ascertained by the configuration utility software.

In yet another aspect of the invention, the sale of new computer hardware is coupled with auctioning off the old computer hardware in order to minimize total cost and thereby maximize the value to the user. Components from the old computer system are checked to determine whether they are compatible with a new computer system the user would like to purchase. Using historical street price databases, the approximate resale price of the old computer is determined with compatible components both included and removed from the old computer and the same compatible components either included or excluded from the price of the perspective new computer based upon whether the component is included in the old computer. A minimum cost is determined by subtracting the street price of the old computer configured without various compatible components from the cost of purchasing the new computer system without those same components.

BRIEF DESCRIPTION OF THE DRAWINGS

The present invention may be better understood, and its numerous objects, features, and advantages made apparent to those skilled in the art by referencing the accompanying drawings.

FIG. 4 is a display from a web page for display of configuration information responsive to a user entering a tag number for an existing computer.

DETAILED DESCRIPTION

Figure 1:
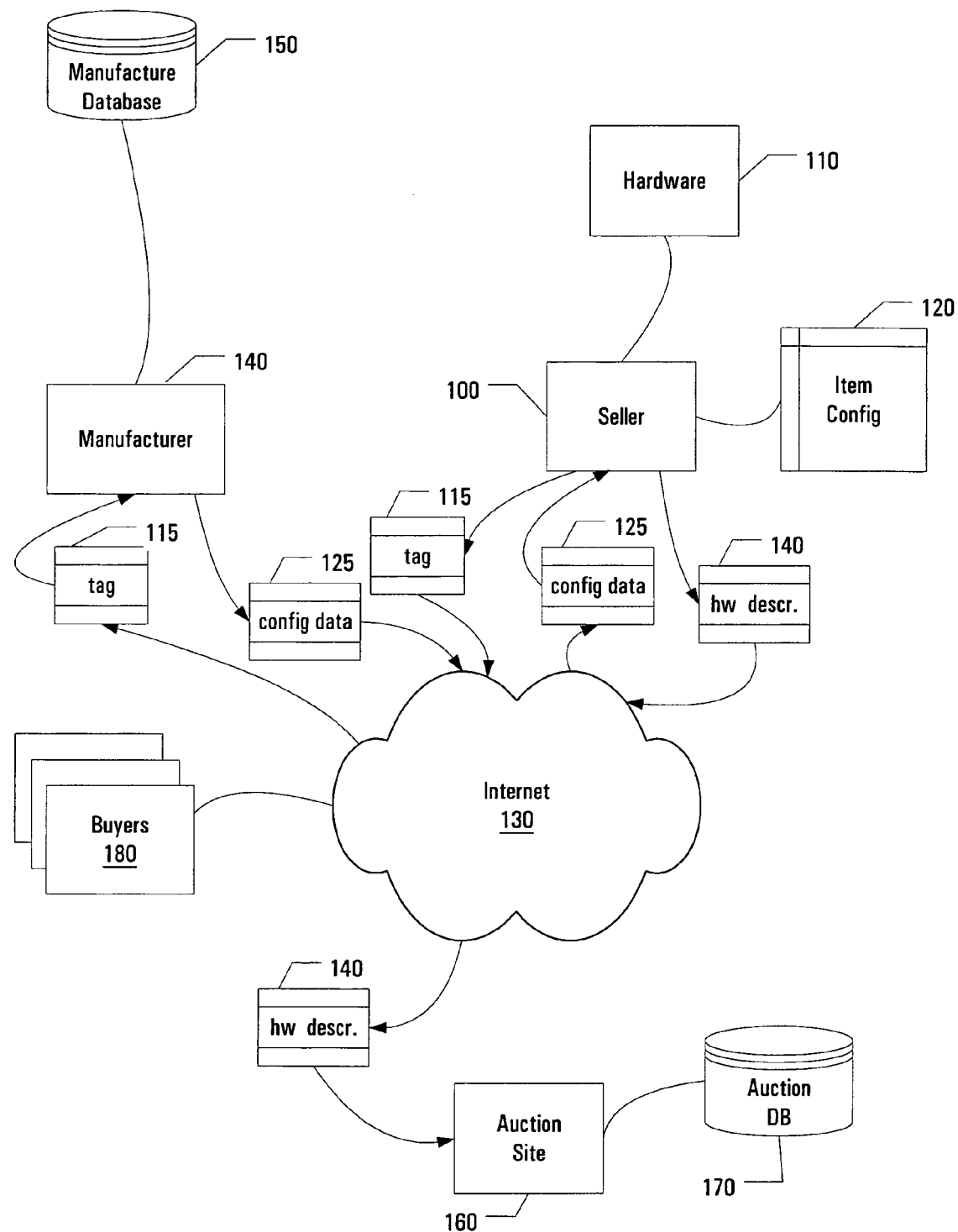
FIG. 1 is a system diagram of a seller receiving configuration information from a manufacturer to provide to an auction site.

FIG. 1 shows a system in which seller 100 receives configuration information 120 related to hardware 110. When seller 100 is interested in selling his or her hardware 110 (e.g., a computer system) on the Internet 130 at auction site 160, it is often difficult to determine the configuration of hardware 110. Manufacturers often keep track of the configuration of hardware they sell to customers with unique codes, or tags, that uniquely identify the particular hardware configuration. For example, a computer system is configured with varying amounts of memory, nonvolatile storage devices (such as hard drives, DVD players, CD-ROM players and recorders, floppy disk drives, ZIP drives, tape drives and the like) various processors (in terms of manufacturer, speed, and functionality), network cards, modems, graphics cards, operating system, and other configuration items. In order to determine the configuration of hardware 110 as originally shipped by manufacturer 140 to seller 100, seller sends a configuration request 115 that includes the tag to manufacturer through computer network 130. In order to utilize computer network 130, such as the Internet, seller logs onto the network, usually through a service provider such as an Internet service provider (ISP) to send configuration request 115. Protocols to send and receive configuration request 115 can include electronic mail (email) messages, a web site for entering the information, a file transfer protocol (FTP) site for downloading the configuration information, and other known protocols for communicating between computers on computer network 130.

Manufacturer 140 receives configuration request 115 from a process connected to computer network 130. The process looks up configuration data 125 from manufacturer database 150 based on the unique tag information provided in configuration request 115. Once configuration data 125 has been located, it is returned to seller 100 through computer network 130. Seller 100 receives configuration data 125 and uses the data to prepare hardware description 120. Because hardware 110 may have been modified after seller 100 received it from manufacturer 140 a process exists to allow seller 100 to modify hardware description 120. For example, if the hardware was a computer system, the user may have increased the amount of memory or added an additional hard drive that would not be reflected in configuration data 125. Seller 100 therefore reviews hardware description, sets an asking price if necessary, and submits hardware description 120 to auction site 160 through computer network 130. Hardware description 120 is added to auction database 170 which is made accessible to prospective buyers 180 (i.e., auction bidders). Buyers 180 receive hardware description 120 by accessing auction site 160 and reviewing the items contained in auction database 170.

Figure 2:
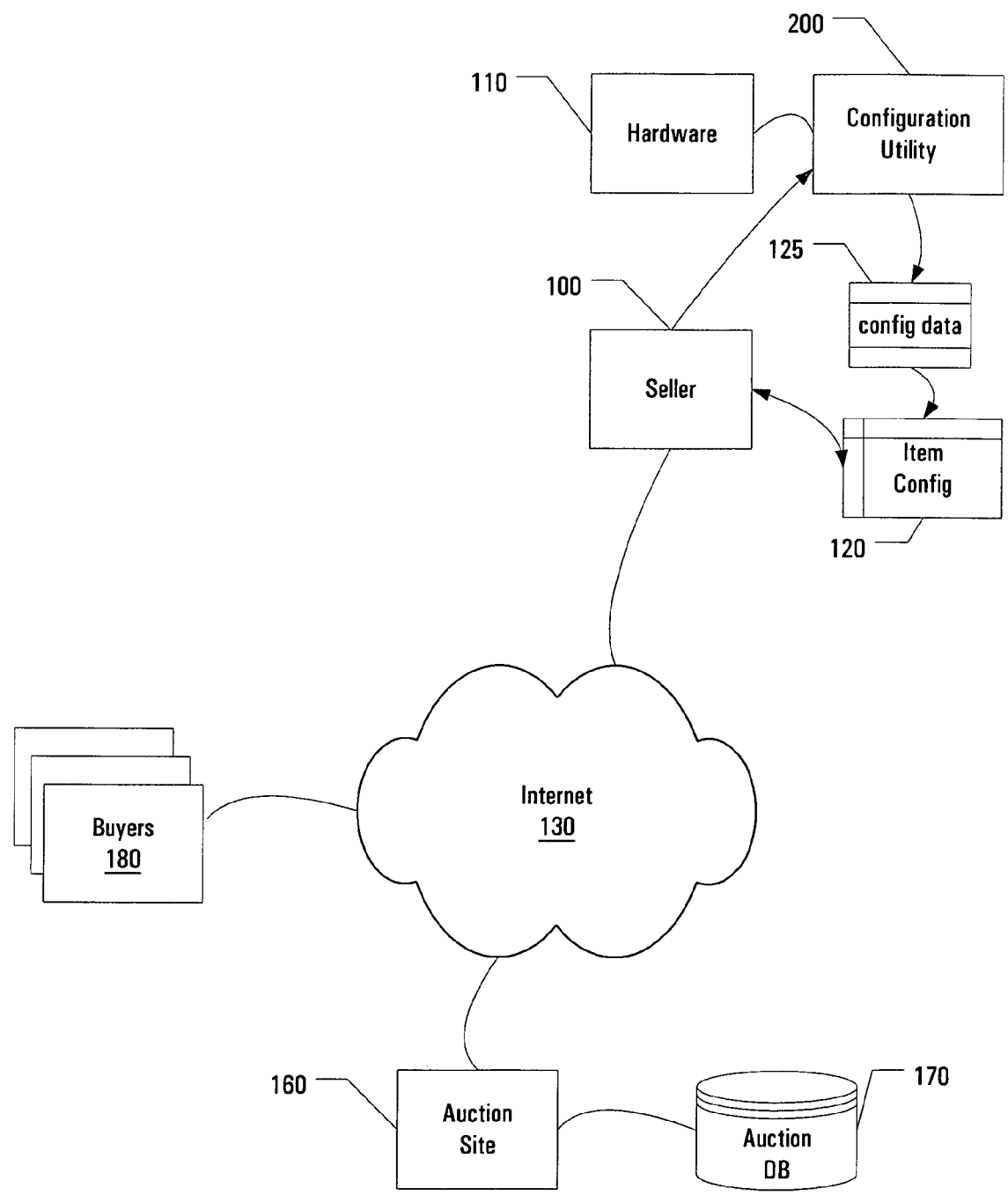
FIG. 2 is a system diagram of a seller receiving configuration information from a configuration utility to provide to an auction site.

Turning to FIG. 2, a system diagram is shown for determining hardware configuration without requesting information from the manufacturer. Seller 100 invokes configuration utility software 200 that analyzes hardware 110 to determine configuration data 125. In a computer system, configuration utility software 200 analyzes hardware 110 by analyzing the operating system registry to determine the hardware that has been added since the hardware was received from the manufacturer. Hardware description 120 is displayed to seller 100 to verify its accuracy and to delete items that seller 100 wishes to remove from hardware before auctioning the hardware on auction site 160 and adding peripheral equipment, such as printers, that may not be turned on and/or recognized by configuration utility software 200. Once hardware description 120 has been edited and verified by seller 100 it is sent through computer network 130 to auction site 160 and added to auction database 170.

Figure 3:
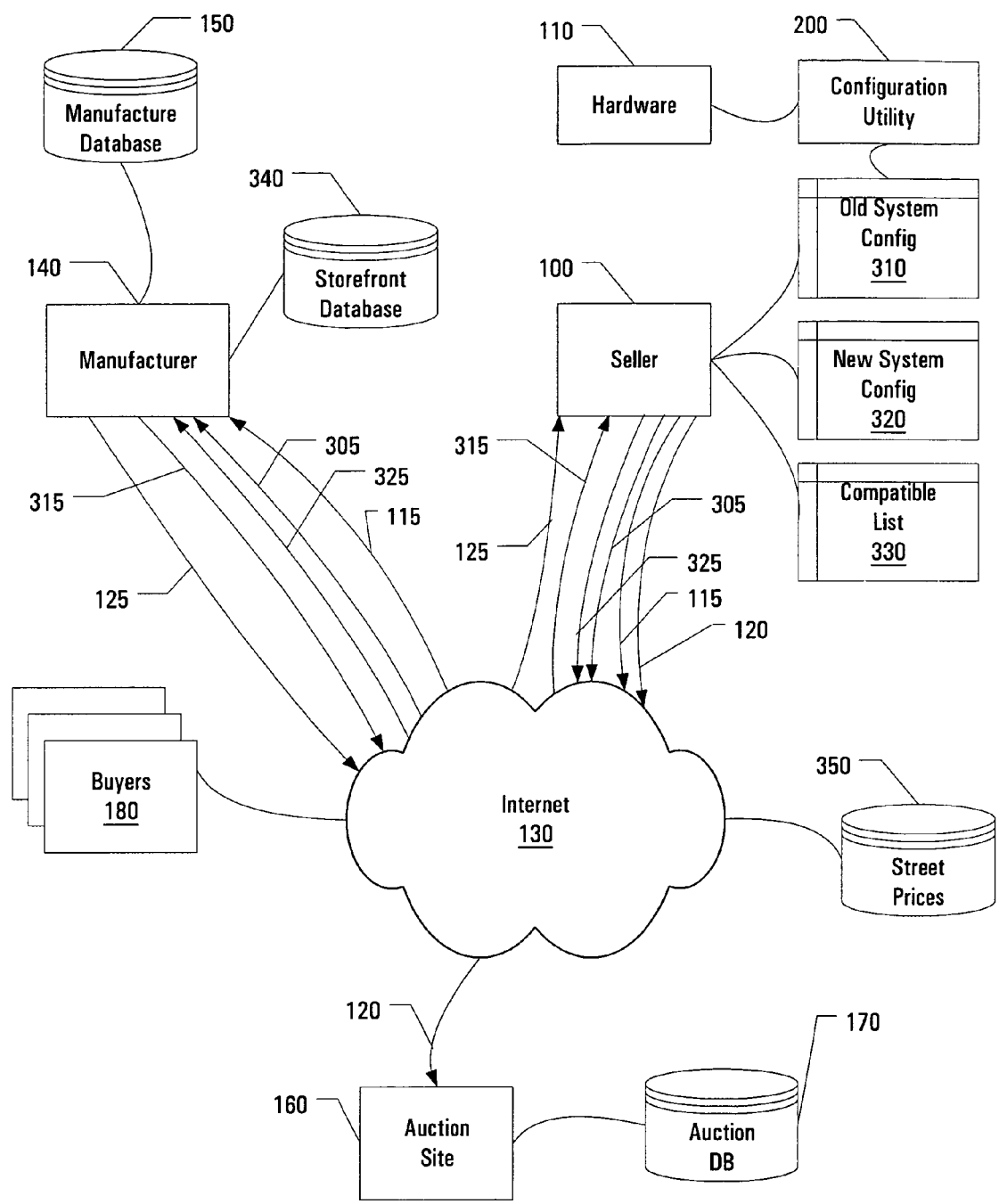
FIG. 3 is a system diagram of a seller receiving configuration information for an existing computer, a new computer system, and compatibility of components between the computers.

FIG. 3 shows a system utilizing manufacturer information and configuration utility software 200 in conjunction with the purchase of a new computer system. Seller 100 initiates the process by accessing manufacturer's new computer hardware catalog stored in storefront database 340. Seller 100 can log onto manufacturer 140 online storefront available from computer network 130. Seller 100 can also use non-computerized means of shopping, such as hardcopy catalogs, to browse hardware selections available from manufacturer 140. Once seller 100 has identified new hardware, seller 100 provides new hardware inquiry 305 which is transmitted to manufacturer 140 over computer network 130. A process at manufacturer 140 gathers new hardware data 315 responsive to inquiry 305 and returns new hardware data 315 to seller 100. New hardware data 315 includes configuration information about the new hardware as well as price information about the components included in the new hardware. This data is stored as new system configuration 320 so that it can be modified by seller 100 (as described below) and eventually used to order a new computer system.

Next, seller 100 requests information about seller's old computer system with configuration request 115. Configuration request 115 is sent to manufacturer 140 and manufacturer returns configuration data 125 similarly to the process described in FIG. 1 above. Configuration data 125 is then stored as old system configuration 310 and compared with new system configuration 320 to determine compatible component list 330. Compatible component list 330 shows seller 100 which components in seller's old computer system can be re-used in a new computer system seller 100 wishes to purchase from manufacturer 140. For example, a DVD drive in seller's old computer may be usable in the new computer system so long as the interface is compatible and the form factor (device size) is equivalent between the two machines (i.e., the old DVD drive will physically fit in the new computer chassis). Another example may be memory that can be used so long as the new computer can use the type of memory that is installed in the old computer. With this information, seller 100 can choose to re-use various components from the old computer system in the new computer system and sell the old computer system without such components. One consideration to be made by seller 100 is how much possible re-use components should actually be reused in the new computer system. For example, if the memory in the old computer system is compatible with the new computer system, seller 100 could choose to remove all the memory from the old computer system and put the memory in the new system. However, this would make the old system unusable (without additional memory) and might severely limit its resale price on an auction site. Another consideration to be made is the cost in terms of time of removing components and putting them in a new system and the risk that such movement could damage the component. To aid in this decision, component street prices 350 includes a database accessible by seller 100 through computer network 130. Using street prices 350, a process at seller 100 can look up the various components that are able to be re-used in the new system as well as review street prices of used computer systems with various component configurations. In order to minimize the overall transaction including buying the new computer system and selling the old computer system, seller 100 needs to select those components for re-use that will provide for the greatest old system price and the lowest new computer price. A simple equation of:

transaction amount=new computer_price−old_computer_price can be used to determine which components should be re-used in the new computer system. Once the lowest transaction amount (net amount seller 100 will pay after sale of the old computer system), seller 100 submits hardware description 120 to auction site 160 for inclusion in auction database 170 that is reviewed and bid upon by perspective buyers 180. In order to make more certain the assumptions of old and new computer prices are met, seller 100 can set an establish a reserve price (minimum price) with auction site using the old_computer_price used in the equation above.

Next, seller 100 submits order request 325 to manufacturer 140 ordering the new computer system configured to match the computer system used in computing the new_computer_price in the equation above. When the new computer arrives, seller 100 installs the re-usable components by removing the components from the old computer system and installing the components in the new computer system.

Turning now to FIG. 4, this figure shows an example embodiment of a display screen used to describe an existing computer system. Tag entry box 400 is used by the user to enter the unique code (tag) originally assigned to the user's computer system by the manufacturer. Once a tag has been entered, the tag information is processed by the manufacturer's computer system which reads the configuration data from the manufacturer's database of previously shipped computers. The configuration data is returned to the user and fills in the descriptive area of FIG. 4. The original configuration data, however, only shows the configuration of the computer system as originally shipped, not as subsequently modified by the user. In order to more accurately describe the computer system, the description area of FIG. 4 is modifiable by the end user to more accurately reflect the actual configuration. In the example shown, some fields, such as manufacturer 410, processor 412, operating system 414, case 422, condition 428, monitor 430, graphics card 432, network card 434, speakers 436, platform 440, and keyboard/mouse 464 are selectable by using a pull down associated with the field. In order to change on of these fields, the user clicks on the downward arrow to the right of the field box and a list of alternates if displayed and selectable. For example, if the user clicked on the downward arrow next to the processor field, a list of alternative processors would be displayed and selectable by the user. In this way, if the user had upgraded the processor, say from a 180 MHz Pentium Pro® processor to a 200 MHz Pentium Pro® processor this change could be made. The other fields that do not have pull downs associated with them, such as memory 416, hard drive 418, CD-ROM? 420, modem 424, part number 426, MHZ 438, Level-2 Cache 440, CPU sockets 444, CPUs installed 446, maximum memory 448, audio 450, tape 452, I/O expansion 454, standard interfaces 456, SCSI interface 458, USB interface 460, chassis/form factor 462, dimensions 466, type 468, disk 470, communications card 472, weight 474, video memory 476, and warranty 478, are text fields that can be enabled to allow the end user to type new or different information in the field. Some fields, such as part number 426 may be protected and made read-only (i.e., not changeable by the end user) since the user should not be able to change the computer part number that was assigned by the manufacturer. If modifications are needed, the user can manually make necessary modifications to the configuration fields described above. However, manual modifications require the user to remember configuration changes that have been made to the computer and often technical details about such modifications. For example, the user may remember that the processor in the computer system was upgraded from the processor returned by manufacturer and displayed in processor 412 field, but the user may not remember exactly which processor was placed in the computer during the upgrade. To more accurately analyze the components in the computer system, configuration utility software (described in FIGS. 2 and 3 above) is executed from the computer system. The configuration utility software runs a series of diagnostics testing the availability and characteristics of possible computer components and returns the results in the configuration fields shown in FIG. 4. To differentiate between the originally installed components and components added as upgrades, the components discovered by the configuration utility software that differ from the components returned by the manufacturer can be highlighted. Some data, such as weight 474, dimensions 466, warranty 478, and chassis/form factor 462 are not generally discoverable by a configuration utility program so the results originally returned by the manufacturer to populate the fields in FIG. 4 aid in describing the computer system. Fields such as weight 474, dimensions 466, and warranty 478 are helpful in auction sites for determining shipping cost, in the case of weight 474 and dimensions 466, as well as providing additional value not reflected solely in the component cost, in the case of warranty 478.

Once the actual configuration of the hardware has been described, the user submits the configuration data collected in the fields shown in FIG. 4 along with a minimum price and other instructions (shipping arrangements, etc.) to the auction web site for auctioning. If the user decides to re-use certain components from the old computer system in a new computer system, as described in FIG. 3 above, the user deletes or modifies information relating to the re-used components before submitting the information to the auction site. For example, if the system has 96 MB of RAM installed and the user decided to re-use 32 MB of RAM, the user would modify the data in memory 416 field to be 64 MB rather than the 96 MB that would otherwise be shown.

After sale information manually collected from the user and also collected from configuration utility software can be further used to update manufacturer database 150 (shown in FIGS. 1 and 3) to reflect such after-sale upgrades and modifications. In addition, the configuration information sent to auction site 170 (shown in FIGS. 1–3) can be used to update manufacturer database 150 reflecting the re-use components that were removed from the computer system. In this way, the manufacturer database reflects the computer system sold to buyer 180 by seller 100 (see FIGS. 1 and 2). Future service calls made to manufacturer 140 by the new buyer 180 can be more efficiently handled because more accurate data is available to the manufacturer.

Figure 5:
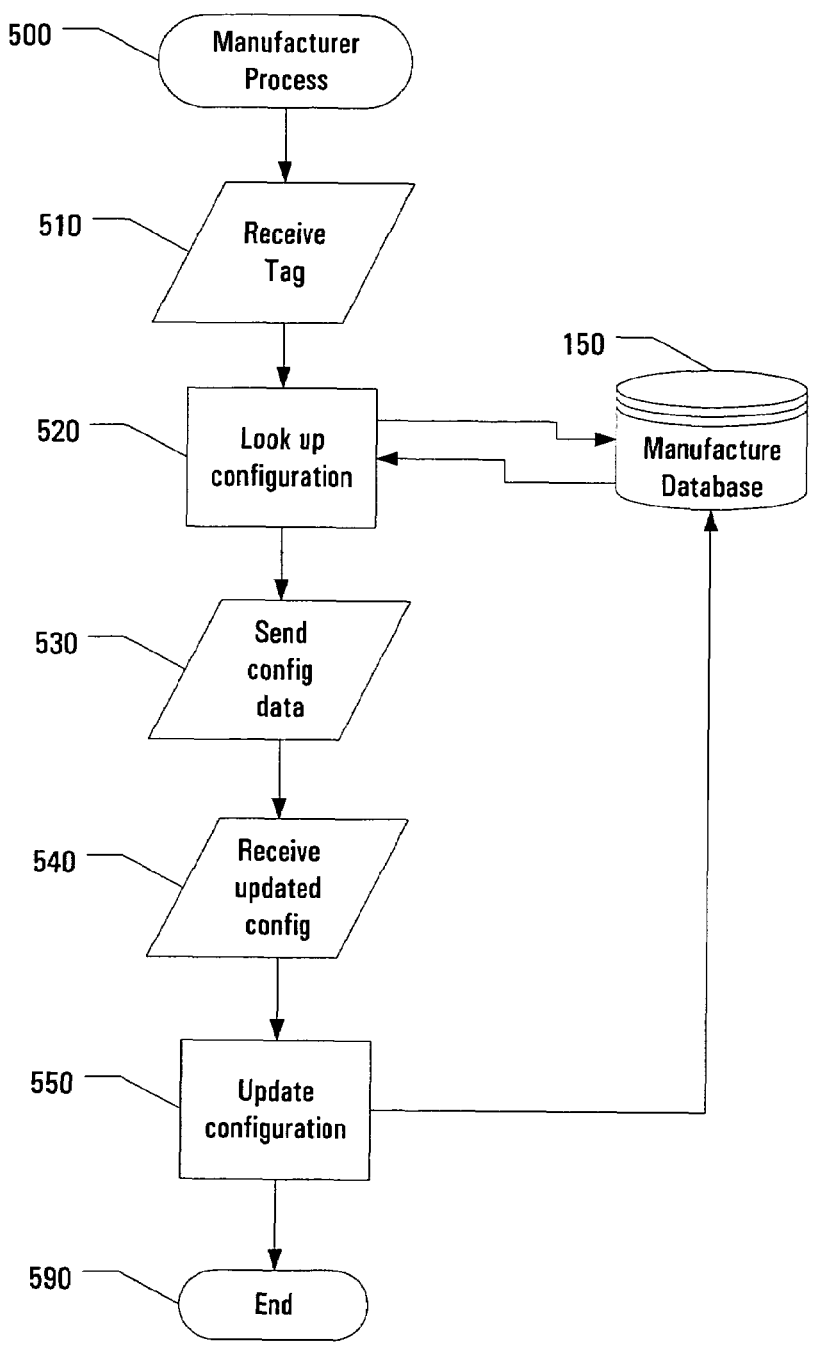
FIG. 5 is a flowchart of a manufacturer receiving configuration requests and updating a configuration database.

Turning to FIG. 5, a flowchart of processing by a manufacturer is shown. Manufacturing process 500 begins with receiving the configuration request which includes receipt of tag 510. Tag 510 uniquely identifies the computer that is the subject of the customers configuration request. Look up configuration process 520 looks up configuration data from manufacturer database 150. Manufacturer database 150 can be a relational database, hierarchical database, or other data store containing data related to computers that have been configured and shipped to manufacturers customers and assigned a unique tag value. If the configuration data is not found, an error is returned to the requesting customer, otherwise the configuration data is sent to the user at send configuration data output 530. If, after reviewing the received configuration data, the customer determines that the configuration data sent by manufacturer at output 530 differs from the actual hardware configuration (as determined by configuration utility software and/or the user manually determining such differences as described above), manufacturer process 500 receives updated configuration data as input 540. The updated configuration data is subsequently used by update configuration routine 550 to update manufacturer database 150. Termination of manufacturer process 500 ends at termination 590.

Figure 6:
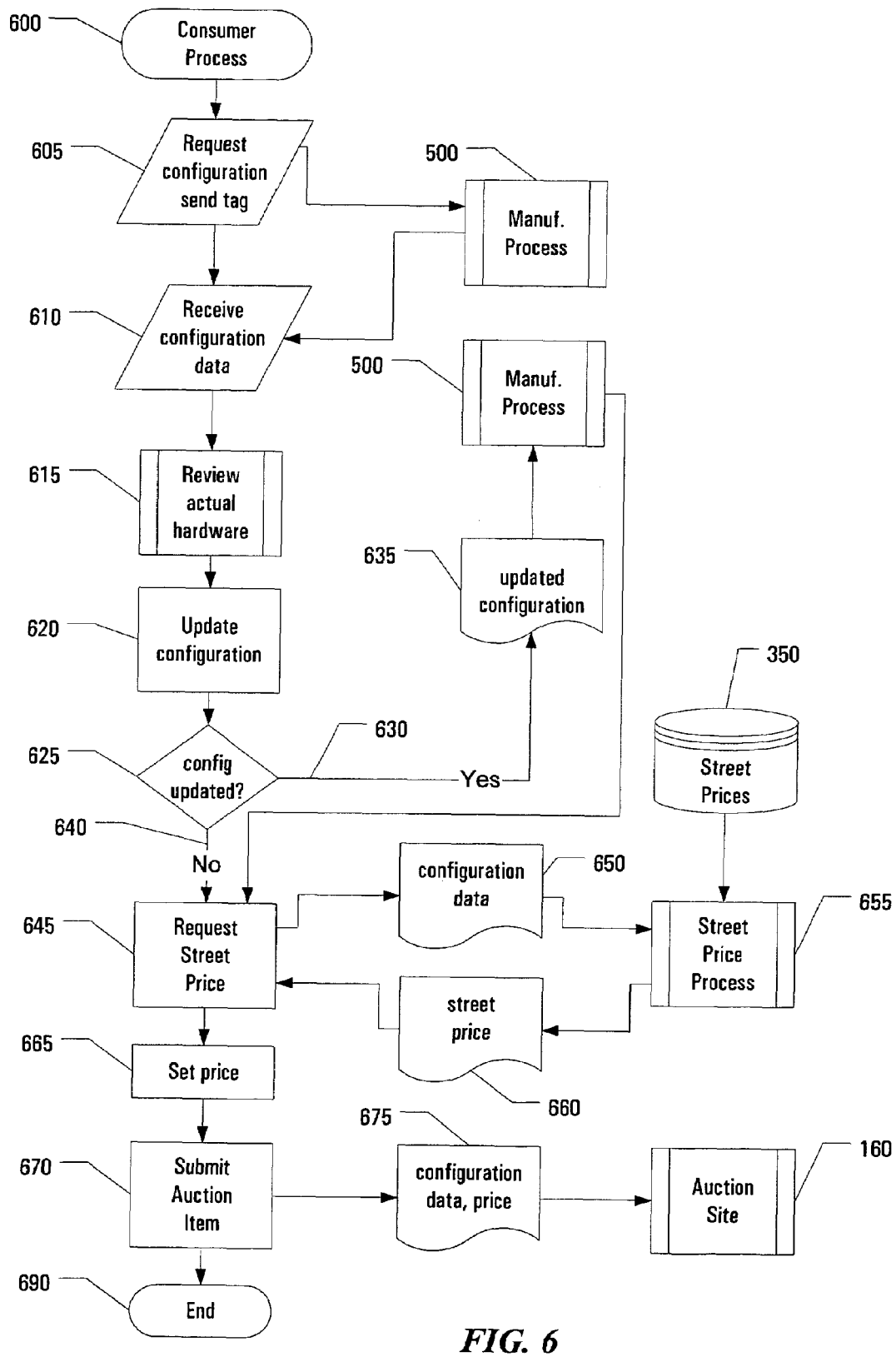
FIG. 6 is a flowchart of a consumer receiving configuration information and submitting an item to an auction

FIG. 6 shows a flowchart for consumer process 600 which coincides with manufacturing process 500 (shown in FIG. 5). The consumer first requests configuration data by sending the unique tag to manufacturer process 500 at output 605. Manufacturer process 500 (described in FIG. 5 above) returns configuration data to receive configuration data input 610. Next, the consumer reviews the configuration data against the actual hardware at process 615 (further described in FIG. 7). If needed, following the review of actual hardware at 615, the consumer updates the configuration data based on the review at update configuration process 620. If the configuration data was updated as determined by decision 625, "yes" branch 630 is executed and manufacturer process 500 is again invoked, this time to update manufacturer database (shown in FIGS. 1 and 3). Next, consumer requests street prices for components included in the configuration data at request street price process 645. Configuration data 650 is sent to external street price process 655 via computer network 130 (shown in FIG. 3) which looks up prices corresponding to configuration data 650 in street price database 350. External street price process 655 returns street prices 660 to consumer process 600 at request street price 645. Based upon the street price information returned by external street price process 655, set price process 665 determines an approximate street price for the hardware included in configuration data 650. The user is able to modify the street price, or in some instances set no minimum price (i.e., a "no reserve" auction item). The configuration data/minimum price data 675 are then sent to external auction site process 160 over computer network 130 (see FIGS. 1–3) and the computer system is included in the auction site database to be bid upon by prospective buyers 180 (see FIGS. 1–3). Consumer process 600 then ends at termination 690.

Figure 7:
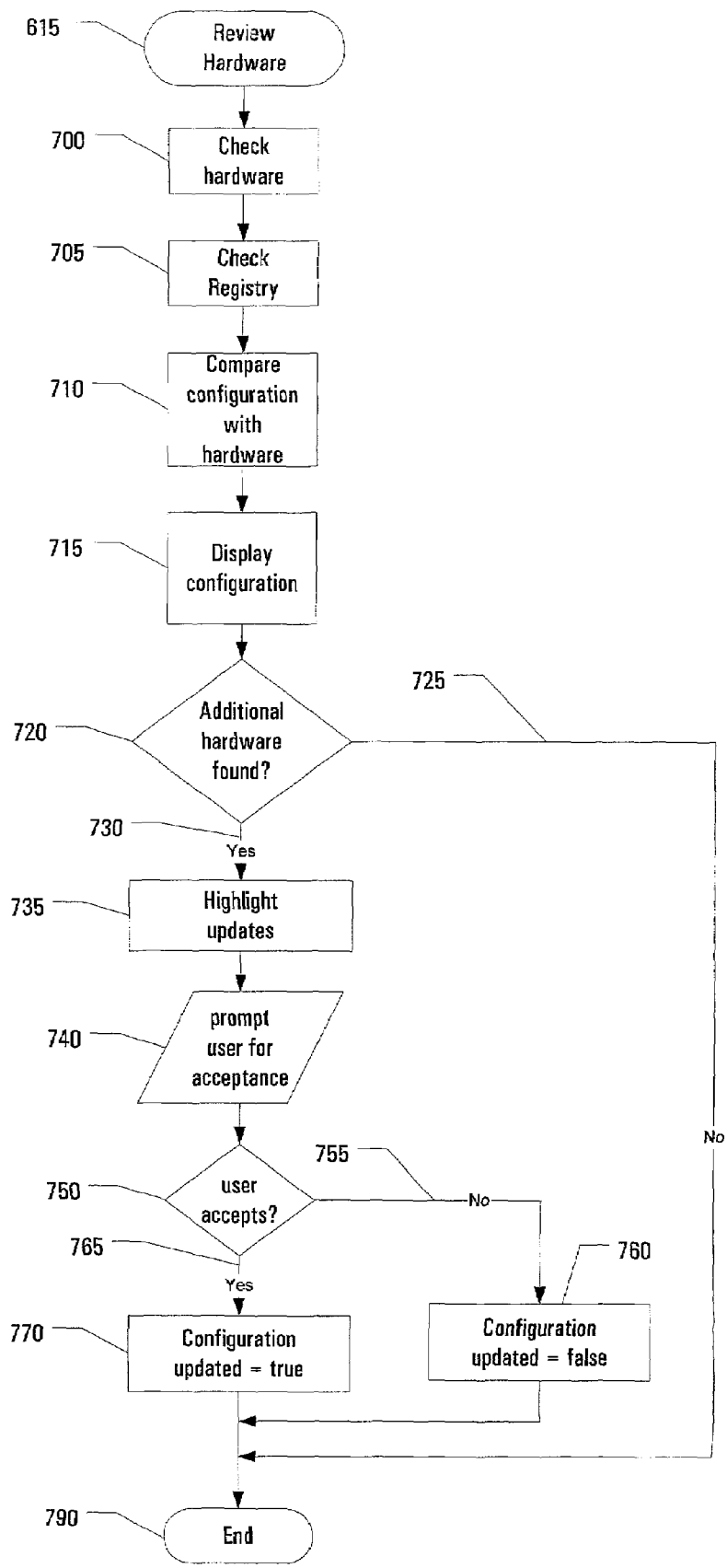
FIG. 7 is a flowchart of a process of automatically determining configuration information.

Turning next to FIG. 7, a process for reviewing hardware configurations is shown. External review hardware process 615 begins with a programmatic check of the physical hardware on the computer system. Diagnostic software analyzes the hardware and determines the actual configuration. As pointed out before, diagnostic software cannot determine such physical characteristics as chassis, system dimensions, and weight. In addition, such diagnostic software may be unable to locate and identify peripheral hardware, such as printers, that are not powered or connected to the computer system. In some operating systems, such as Microsoft Windows 95/98/NT, a registry similar to a database that describes the hardware and software of the system and is used by the operating system to manage the computer.

As various devices are added or removed from the computer system, hardware profile data is written into the registry. The registry is capable of being read and analyzed by external programs. During check registry process 705, the registry is read and analyzed to gather hardware information that was either not found or not available with the diagnostic routines during the check hardware process 700.

After check hardware process 700 and check registry process 705 have completed, the information found is compared with the configuration data returned by the manufacturer at compare process 710. The configuration data is then displayed at display process 715 along with the configuration data found by the check hardware and registry processes 700 and 705 highlighted on the display. If no additional configuration data is found by check hardware process 700 and check registry 705, decision 720 branches control to "no" branch 725 leading to the end of the review hardware process at termination 790. If, on the other hand, additional configuration data was found by check hardware process 700 and check registry process 705, the manufacturer database does not reflect the actual hardware and decision 720 branches control to "yes" branch 730.

During the subprocess handling additional hardware found in the computer system, the differences between the configuration data provided by the manufacturer and the configuration data determined by the check hardware and check registry processes 700 and 705 are highlighted on the display screen at highlight updates process 735. The user is prompted at output 740 to accept or reject hardware changes that are made to catch possible erroneous results from the comparison process. If the user accepts a configuration update at decision 750, an update flag is set to "true" which will result in updated configuration data being sent to manufacturer through branch 630 in consumer process 600 (shown in FIG. 6). On the other hand, if the user rejects the proposed configuration update, the update flag is set to "false" which bypasses updating the configuration data through branch 640 in consumer process 600 (shown in FIG. 6). Review hardware process 615 ends at termination 790 and control is returned to process 620 shown in FIG. 6.

Figure 8:
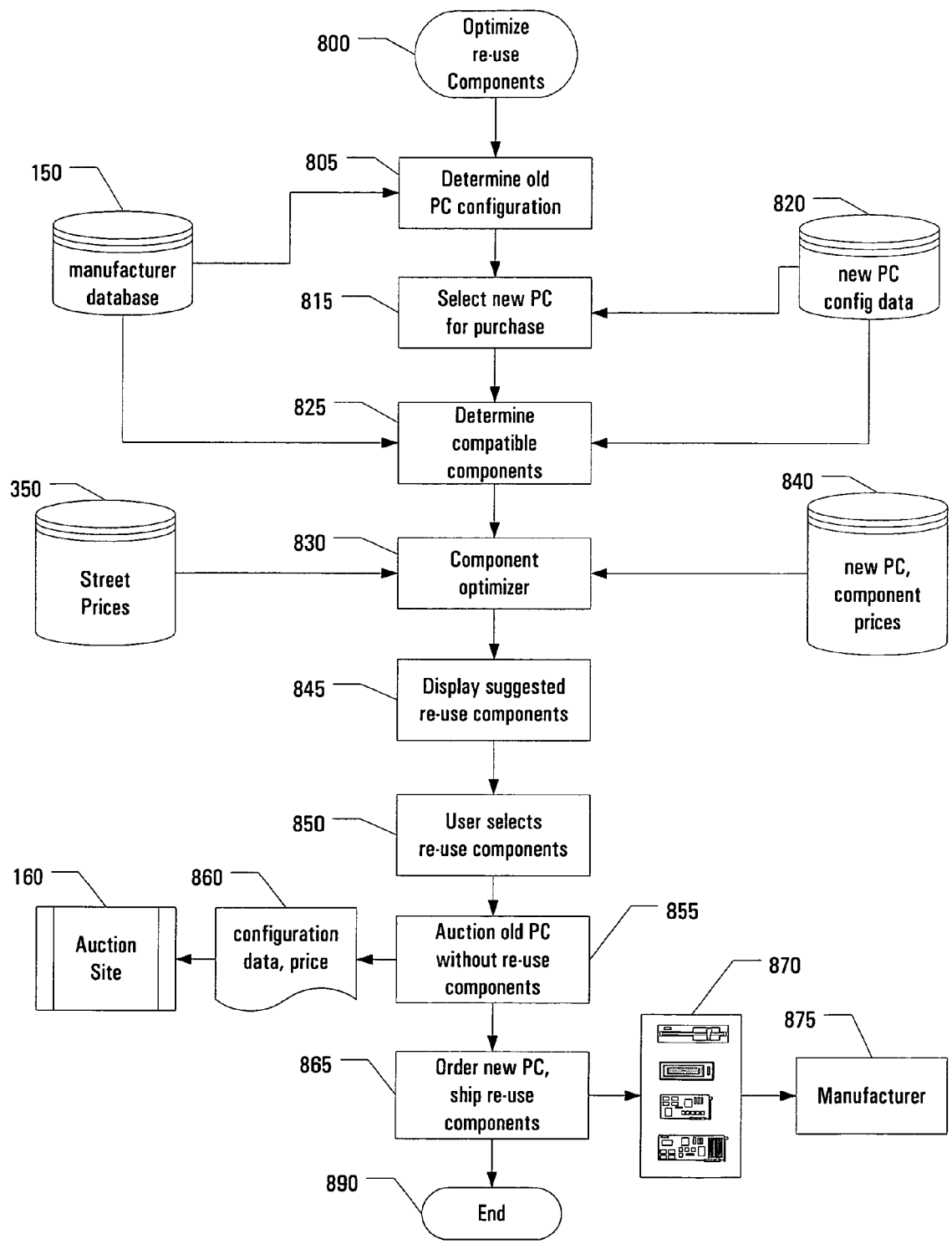
FIG. 8 is a flowchart of a process for optimizing re-use of components in a new computer system from an existing computer system.

FIG. 8 shows a flowchart for optimizing the re-use of components as described in FIG. 3 above. Optimize re-use components 800 compares the configuration of an old computer with the requirements and specifications of a new computer that the user wishes to purchase to determine which components may be re-used and how the user might minimize the cost of the overall transaction of removing components from the old computer, selling the old computer without the removed components, buying a new computer system, and installing the removed components into the new system.

At process 805 the configuration of the old computer system is determined by receiving configuration data from manufacturer database 150 through manufacturer 140 (see FIGS. 1 and 3). In addition, updated configuration data is gathered at process 805 by checking the hardware with diagnostic software and analyzing the operating system registry as described in FIG. 7. Once the old computer configuration has been determined, the user selects a new computer he or she is interested in purchasing at process 815. The manufacturer returns configuration data related to the components in the new computer from database 820 containing new computer configuration data. The configuration data contains specifications and requirements needed to determine if old computer components can be re-used in the new computer system. At determine compatible components process 825 the configuration data related to the new computer is compared to the configuration data related to the old computer to determine which components can be reused in the new computer. Next, the component optimizer process receives used computers prices from street price database 350 for computers with similar configurations as the old computer system and also receives prices for new components from the manufacturer stored in new component price database 840. By using a simple equation such as transaction amount=new_computer_price−old_computer_price component optimizer 830 repeatedly calculates new_computer_price by subtracting the cost of certain components and subtracts from new_computer_price the old_computer_price that is expected if such re-useable components are removed from the old computer before being auctioned off. When the transaction amount is minimized, component optimizer 830 terminates and suggested re-use components are displayed to the user at 845. The user can choose which re-usable components he or she wishes to actually remove from the old computer at selection 850. Non-monetary factors such as the difficulty of removing components might be used by a user to determine whether a component will be re-used in the new computer system. Once the user has selected the re-use components at selection 850, he or she sends hardware configuration 860 (not including such removed components) to external auction site 160 through a computer network (see FIGS. 1–3). The user also orders the new computer without ordering the re-use components at order process 865. As shown, the re-use components 870 are shipped to manufacturer 875 for installation in the new computer system. In addition, components 870 can be retained by user 870 and installed in the new computer when it arrives from manufacturer 875. Optimize re-use components 800 then ends at termination 890. The order of the above-described steps does not necessarily have to occur in the order described. For example, the user may want to order the new computer and install the re-use components before auctioning off the old computer so that the user is not without a computer.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of comparing hardware comprising:
   accessing a first manufacturer's storefront database, wherein accessing includes logging onto the first manufacturer's storefront database from a first computer network;
   requesting information about an old computer system using a first configuration request;
   receiving old system configuration data for the old computer system from the first manufacturer's database, wherein the old system configuration data includes old hardware configuration data;
   storing the old system configuration data as an old system configuration, wherein the old system configuration includes the old system configuration data;
   executing configuration utility software on the old computer system;
   highlighting any components of the old computer system identified by the configuration utility software as differing from the old system configuration data,
   altering the old system configuration to reflect any different components identified by the configuration utility software;
   accessing a second manufacturer's storefront database using a second computer network, wherein a new computer hardware catalog is stored in the second manufacturer's storefront database, and wherein accessing the
   second manufacturer's storefront database includes accessing the new computer hardware catalog;
   transmitting a new hardware inquiry second configuration request to the second manufacturer's storefront database, wherein the second configuration request includes a new hardware inquiry, and wherein transmitting the second configuration request includes transmitting the new hardware inquiry;
   receiving new hardware system configuration data corresponding to a new computer system from the second manufacturer;
   wherein the new system configuration data includes new hardware configuration data;
   electronically comparing the new hardware system configuration data and the old hardware system configuration data;
   determining a compatible component list indicating at least one components of the old computer system that is reusable in the new computer system;
   determining street prices of the old computer system with and without at least one component of the old computer system that is reusable in the new computer system; and
   determining prices of the new computer system with and without at least one component of the old computer system that is reusable in the new computer system.

2. The method of claim 1, further comprising selecting at least one component of the old computer system for reuse in the new computer system.

3. The method of claim 1, further comprising the first manufacturer being the same as the second manufacturer.

4. The method of claim 1, further comprising the first computer network being the same as the second computer network.

5. The method of claim 1, further comprising determining whether to reuse at least one component of the old computer system in the new computer system based on the street prices.

6. The method of claim 1, further comprising transmitting a hardware description to an online auction site comprising the old system configuration minus at least one component to be reused in the new computer system.

7. The method of claim 1, wherein the first configuration request further comprises a unique tag corresponding to the old computer system.

8. A method of comparing hardware comprising:
   obtaining old configuration data over a first computer network for an old computer system from a first manufacturer using a unique tag that uniquely identifies the old computer system;
   obtaining new configuration data over a second computer network for a new computer system from a second manufacturer;
   electronically comparing the new configuration data and the old configuration data;

determining a compatible component list indicating at least one component of the old computer system that is reusable in the new computer system;

determining street prices of the old computer system with and without at least one component of the old computer system that is reusable in the new computer system; and determining prices of the new computer system with and without at least one component of the old computer system that is reusable in the new computer system.

9. The method of claim 8, further comprising:

executing a configuration utility to determine an actual configuration of the old computer system; and modifying the old configuration data to reflect the actual configuration of the old computer system.

10. The method of claim 8, further comprising the first manufacturer the same as the second manufacturer and the first computer network the same as the second computer network.

11. The method of claim 8, further comprising removing at least one component to be reused in the new computer system from the old configuration data.

12. The method of claim 8, further comprising transmitting the old configuration data to an online auction site.

13. A method of selecting an optimal transaction amount for the purchase of a new computer comprising:

obtaining old configuration data over a first computer network for an old computer system from a first manufacturer using a tag that uniquely identifies the old computer system;

obtaining new configuration data over a second computer network for a new computer system from a second manufacturer;

electronically comparing the new configuration data and the old configuration data;

determining a compatible component list indicating at least one reusable component of the old computer system that is reusable in the new computer system;

determining the street prices of the old computer system with and without the reusable component;

determining the prices of the new computer system with and without the reusable component; and computing transaction amounts with and without reuse of the reusable component, the transaction amount equal to the new computer price minus the old computer price; and selecting the lowest transaction amount.

14. The method of claim 13, further comprising modifying the new configuration data to omit at least one reusable component selected based on the lowest transaction amount and ordering a new computer system corresponding to the new configuration data.

15. The method of claim 13, further comprising modifying the new configuration data to indicate at least one reusable component selected based on the lowest transaction amount and ordering a new computer system lacking hardware corresponding to the reusable component.

16. The method of claim 13, further comprising modifying the old configuration data to omit at least one reusable component selected based on the lowest transaction amount and transmitting the old configuration data to an online auction system.

17. The method of claim 13, further comprising:

executing a configuration utility to determine the actual configuration of the old computer system; and modifying the old configuration data to reflect the actual configuration of the old computer system, wherein executing and modifying are performed prior to electronically comparing the new configuration data and the old configuration data.

18. The method of claim 17, further comprising:

highlighting any components of the old computer system identified by the configuration utility software as differing from the old configuration data received from the manufacturer, altering the old configuration data to reflect any different components identified by the configuration utility software.

* * * * *